(12) United States Patent
Garnett

(10) Patent No.: US 7,237,082 B1
(45) Date of Patent: Jun. 26, 2007

(54) SPATIALLY DISTRIBUTED PARITY PROTECTION

(75) Inventor: Paul J. Garnett, Camberley (GB)

(73) Assignee: Sun Microsystems, Inc., Santa Clara, CA (US)

( * ) Notice: Subject to any disclaimer, the term of this patent is extended or adjusted under 35 U.S.C. 154(b) by 360 days.

(21) Appl. No.: 10/863,112

(22) Filed: Jun. 8, 2004

(51) Int. Cl.
*G06F 12/14* (2006.01)
(52) U.S. Cl. .................... 711/163; 711/164
(58) Field of Classification Search .......... None
See application file for complete search history.

(56) References Cited

U.S. PATENT DOCUMENTS 5,117,428 A * 5/1992 Jeppesen et al. ............ 714/45

6,052,816 A * 4/2000 Yoshinogawa ............ 714/766

FOREIGN PATENT DOCUMENTS

JP   793173   * 9/1997

* cited by examiner

*Primary Examiner*—T Nguyen
(74) *Attorney, Agent, or Firm*—Meyertons Hood Kivlin Kowert & Goetzel, P.C.; B. Noeël Kivlin (57) ABSTRACT

In order to provide protection for first information, protection information, for example parity information, for the first information is spatially distributed with respect to the first information in memory. A logic unit maps the first information and the spatially distributed information corresponding thereto from them memory onto a connection operating under a protocol supporting the protection information.

41 Claims, 4 Drawing Sheets

SPATIALLY DISTRIBUTED PARITY PROTECTION

BACKGROUND OF THE INVENTION

The present invention relates to computer systems, and to the diagnosis of computer system errors.

Computer systems are becoming more complex and as a direct result more difficult to diagnose when they go wrong. Soft and transient errors further make diagnosis more difficult because the "fault" can disappear when an attempt is made to diagnose an error.

Mechanisms have been proposed for the diagnosis of errors in system-level interconnects and also in large DRAM and SRAM arrays. However, this does not address the protection of other interconnects within a system. Although such interconnects are typically fairly robust, faults can still occur.

For example, boot information for a processor is typically held in a programmable read-only memory (PROM) that is not parity protected. In normal usage, the PROM and bus system through which it is accessed are very reliable, so that this has not conventionally been seen as a problem. However, very rarely, the information held in the PROM 30 could become corrupted, for example as a result of a cosmic ray event. In this case, it is possible that incorrect information can be provided to the processor via the bus system. As the PROM contains boot information, and is used by the processor at an initial boot time, then this could cause a problem in that the processor might not start correctly or hang during a restart.

SUMMARY OF THE INVENTION

An aspect of the present invention provides a computer subsystem that includes a logic unit connectable to a system unit via a system interface and to memory via a memory interface, wherein first information transmitted via the system interface is protected by protection information. The logic unit is operable to map the first information between a first region of the memory and the system interface and to map the protection information between a second region of the memory and the system interface.

By providing for the mapping of protection information in a spatially distributed manner with respect the to the data to which it relates, security for the protection information can be achieved, even where a memory interface does not provide for protection of the first information passing via the memory interface and/or the memory is not otherwise configured to hold protection information for the first information.

For example, in one example of the invention the memory interface comprises a serial interface and the memory is configured to store bytes, or multiples of bytes of data, and neither the serial interface nor the memory is otherwise configured to provide for parity or error correction codes.

Another aspect of the invention provides a computer system that includes a system unit, a logic unit connected to the system unit via a system interface and a memory connected to the logic unit via a memory interface, wherein first information transmitted via the system interface is protected by protection information. The logic unit is operable to map the first information between a first region of the memory and the system interface and to map the protection information between a second region of the memory and the system interface.

Another aspect of the invention provides a method of providing protection for first information, the method comprising a logic unit connected to a system unit via a system interface, wherein the first information is transmitted via the system interface protected by protection information, and connected to memory via a memory interface, the logic unit mapping the first information between a first region of the memory and the system interface and mapping the protection information between a second region of the memory and the system interface.

Accordingly, an embodiment of the invention can provide protection for first information by spatially distributing protection information with respect to the first information.

BRIEF DESCRIPTION OF THE DRAWINGS

Embodiments of the present invention will be described hereinafter, by way of example only, with reference to the accompanying drawings in which like reference signs relate to like elements and in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims. In this regard, combinations of features from the independent claims with features of dependent claims other than as presented by the dependencies of the claims, and also with features from the description, are envisaged.

DESCRIPTION OF PARTICULAR EMBODIMENTS

In the following, examples of the present invention will be described whereby protection information, for example parity information is stored in a distributed manner with respect to information to be protected.

Figure 1:
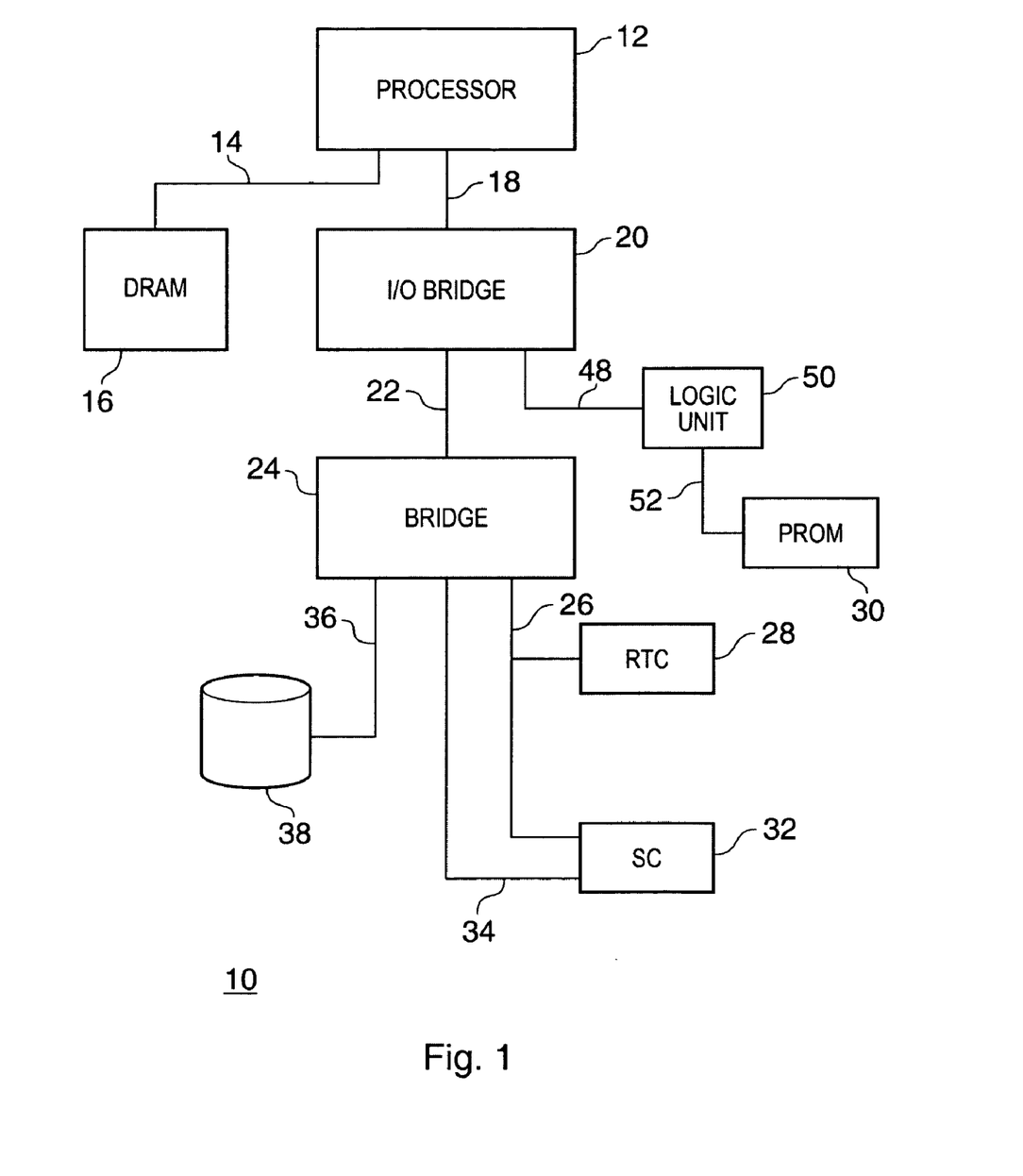
FIG. 1 is a schematic block diagram illustrating components of an example of a computer system in accordance with an embodiment of the invention.

FIG. 1 is a schematic block diagram of components of one example of a computer system 10 in accordance with the invention. The computer system 10 can, for example, be a computer server system. The computer server system could be located remotely from an operator, for example where the server forms part of a server farm that is remotely controlled. The computer system 10 illustrated in FIG. 1 includes a microprocessor 12.

As illustrated in FIG. 1, the processor 12 is connected via a memory bus 14 to Dynamic Random Access Memory 16, for example in the form of buffered dynamic random access memory (DRAM).

The processor 12 is also connected via a processor bus 18 to an I/O bridge 20. The I/O bridge 20 is in turn connected to one or more I/O buses, for example an I/O bus 22 and a further bus 48. In the present example, a PCI bus architecture can be employed for the buses 18, 22 and 48, although in other examples other bus architectures, for example an Infiniband bus architecture could be used.

A further bus bridge, for example a so-called SouthBridge bus bridge 24 can be connected to the I/O bus 22. A SouthBridge 24 is a standard form of bus bridge. It can provide functions including one or more of the following: an Xbus interface for access via an Xbus 26 (which is a generic 8 bit asynchronous bus) to a real time clock (RTC) 28, and a service controller 32; a serial console interface on a service bus 34 to the service controller 32 that is used for operating system functions including a console function; and an IDE (Integrated Drive Electronics) interface that provides an ATA-100 (AT Attachment) IDE connection 36 to an IDE disk drive 38.

The service controller 32 can, for example, be implemented as a microcontroller. The service controller can provide various functions, including for example: access to a FRU-ID for the information processing cartridge; communicating with a remote controller; control of power on reset (POR), system reset and externally initiated reset (XIR) to the microprocessor 12; control of the power, service-required and LED indicators; upgrading of field-upgradable firmware; a watchdog function for the operating system; monitoring the speed of fans; and communications with the operating system via the Xbus 26.

A logic unit 50 is connected to the further bus 48, in the present instance a PCI bus. The PCI buses in FIG. 1 are protected by parity. The PROM 30 for holding initial boot information is connected to the logic unit 50. The logic unit 50 is operable to enable data to be held in the PROM 30 with protection information (e.g., parity or error correction codes), even where the PROM 30 has an addressable unit that does not provide for protection information. The protection information is held in the PROM 30 in a spatially distributed manner with respect to the data to which it relates. This data and the protection information can then be used at system initiation to verify the data read from the PROM, whereby the information to be supplied to the processor 12 can be checked to ensure the correct configuration of the computer system. An example configuration of the logic unit will be described later with reference to FIG. 4.

Figure 2:
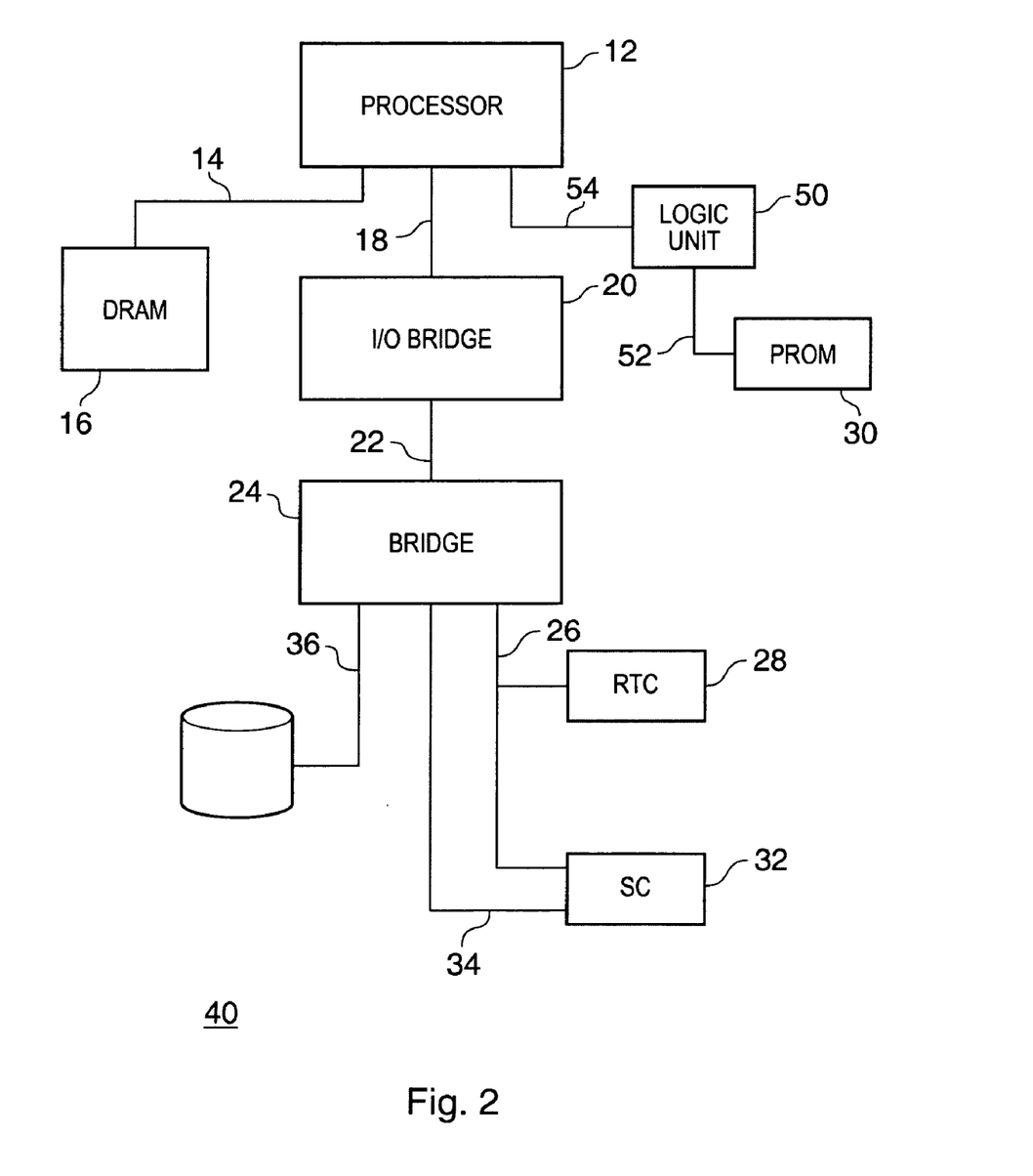
FIG. 2 is a schematic block diagram illustrating components of an example of a computer system in accordance with an embodiment of the invention.

FIG. 2 is a schematic block diagram of components of another example of a computer system 40 in accordance with the invention. The computer system of FIG. 2 is comparable to the computer system of FIG. 1. As for the computer system of FIG. 1, the computer system 40 can, for example, be a computer server system. The computer system 40 illustrated in FIG. 2 includes a microprocessor 12.

As illustrated in FIG. 2, the processor 12 is connected via a memory bus 14 to Dynamic Random Access Memory 16, for example in the form of buffered dynamic random access memory (DRAM). In this example the processor is also connected via a further bus 54 to a logic unit 50. The processor 12 is also connected via a processor bus 18 to an I/O bridge 20. In the present instance the processor 12 is configured to support a connection to multiple buses, or alternatively that a bus bridge is incorporated within the processor represented at 12.

The I/O bridge 20 is in turn connected to one or more I/O buses, for example an I/O bus 22. In the present example, a PCI bus architecture can be employed for the buses 18, 22, although in other examples other bus architectures, for example an Infiniband bus architecture could be used.

A further bus bridge, for example a so-called SouthBridge bus bridge 24 can be connected to the I/O bus 22. A SouthBridge 24 is a standard form of bus bridge. It can provide functions including one or more of the following: an Xbus interface for access via an Xbus 26 to a real time clock (RTC) 28, and a service controller 32; a serial console interface on a service bus 34 to the service controller 32 that is used for operating system functions including a console function; and an IDE (Integrated Drive Electronics) interface that provides an ATA-100 (AT Attachment) IDE connection 36 to an IDE disk drive 38.

The service controller 32 can, for example, be implemented as a microcontroller (e.g., a Hitachi H8 microcontroller). The service controller can provide various functions, including for example: access to the PROM 30 for boot information and a FRU-ID for the information processing cartridge; communicating with a remote controller; control of power on reset (POR), system reset and externally initiated reset (XIR) to the microprocessor 12; control of the power, service-required and LED indicators; upgrading of field-upgradable firmware; a watchdog function for the operating system; monitoring the speed of fans; and communications with the operating system via the Xbus 26.

The logic unit 50 connected to the further bus 48 in FIG. 2 can be configured similarly to the logic unit 50 of FIG. 1. The bus 48 could be a PCI bus, or it could alternatively be a bus operating under another protocol that provides protection, for example parity protection, for data passed via the bus 50. The logic unit 50 is operable to enable data to be held in the PROM 30 with protection information (e.g., parity or error correction codes), even where the PROM has an addressable unit that does not provide for protection information. The protection information is held in the PROM 30 in a spatially distributed manner with respect to the data to which it relates. This data and the protection information can then be used at system initiation to verify the data read from the PROM, whereby the information to be supplied to the processor 12 can be checked to ensure the correct configuration of the computer system. An example configuration of the logic unit will be described later with reference to FIG. 4.

Figure 3:
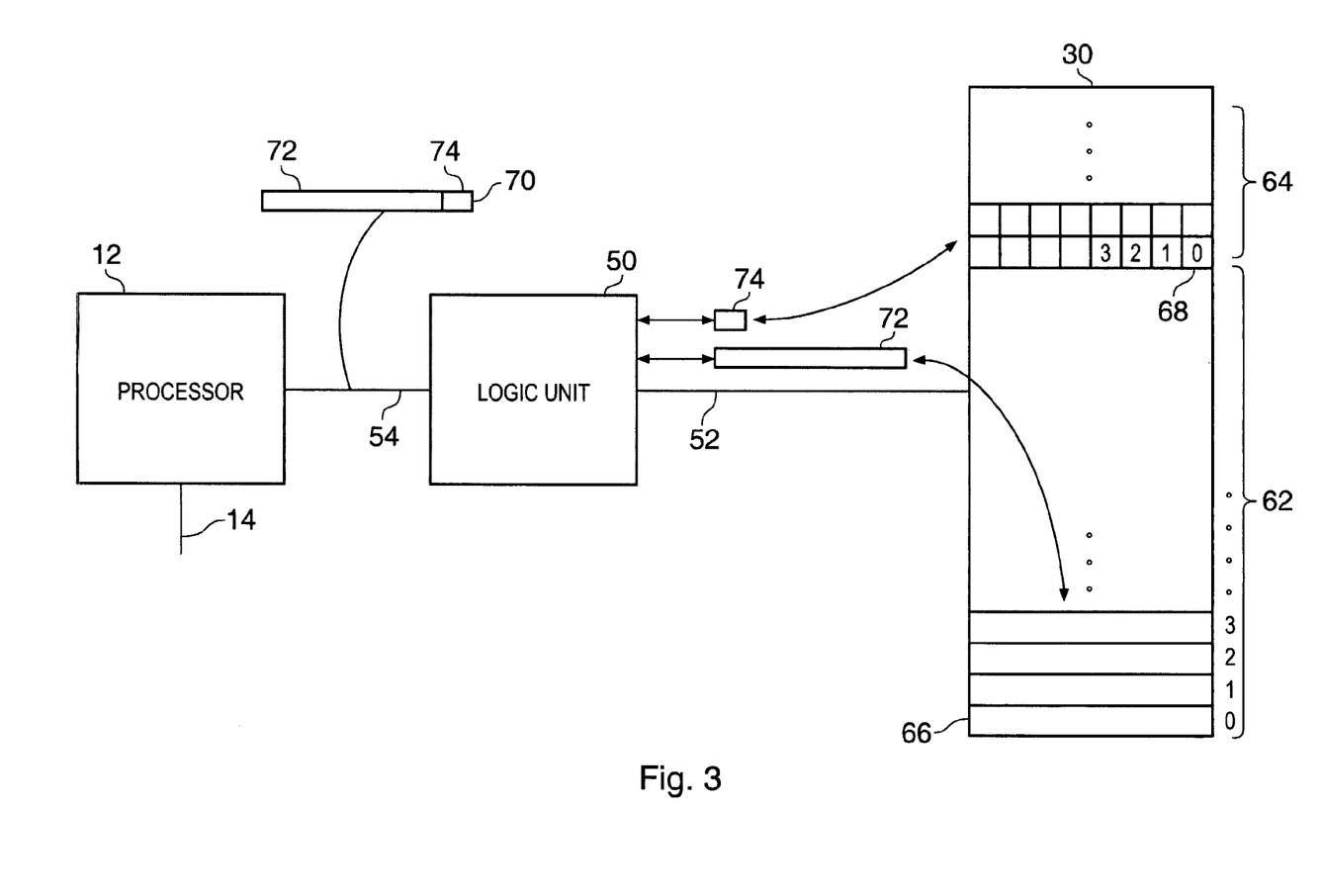
FIG. 3 is a schematic block diagram illustrating part of the computer system of FIG. 3 in more detail.

FIG. 3 provides a schematic representation of the manner in which the logic unit 50 is operable to provide spatially distributed protection for data. FIG. 3 represents part of FIG. 2, in which the logic unit is connected via the bus 54 to the processor 12. The logic unit 50 can be implemented as a field programmable logic unit, for example a field programmable gate array (FPGA). The logic unit can be configured as an integrated circuit separate from the processor unit 12. A further integrated circuit can form the memory 30. Alternatively, however, the processor 12 and the bus 54 could be replaced by the I/O bridge 24 and the bus 48 of FIG. 1, whereby FIG. 3 would then represent part of FIG. 1.

In an example embodiment, as described above, the information held in the memory 30 comprises system boot information. However, it could comprise other information as well or instead as the boot information. The memory in the present example is non-volatile memory, specifically a flash programmable read-only memory (PROM), although the invention is not limited thereto. Although in the present example the memory 30 is a PROM, as data is read from rather than written to the memory, the invention is also application to memory 30 that can be read from and written to.

As illustrated in FIG. 3, information 70 passed via the bus 54 includes data 72 and protection information (e.g., parity information) 74. The logic unit 50 is operable to provide a mapping of data and associated protection information from different regions of the memory 30 to form the data to be passed via the bus 54. Thus, in the example shown, each byte of data 72 is mapped to the bus 52 from a respective memory word 66 in a first region 62 of the memory 30 and a parity bit from a corresponding bit 68 in a second region 64 of the memory 30.

As can be seen in FIG. 3, the first region of the memory 62 comprises a first plurality of contiguous address locations and the second region of the memory comprises a second plurality of contiguous address locations. The computer subsystem of claim 8, wherein the mapping of the protection information to the second region of memory is dependent on the mapping of the first information to the first region of memory. The ordering of the protection information in the second region of memory is arranged to correspond to the ordering of the corresponding blocks of first information in the first region of memory. However, where the protection information comprises parity information, as in the present instance, each bit in the second region corresponds to each byte in the first region. In other words, in the present example, the parity information for eight bytes of data in the first region is held in a single byte in the second region.

In other examples embodiments, the protection information can comprise error correction information. In this case, more than one bit of protection information would be needed for each byte, whereby the mapping between the first and second regions would be different.

Figure 4:
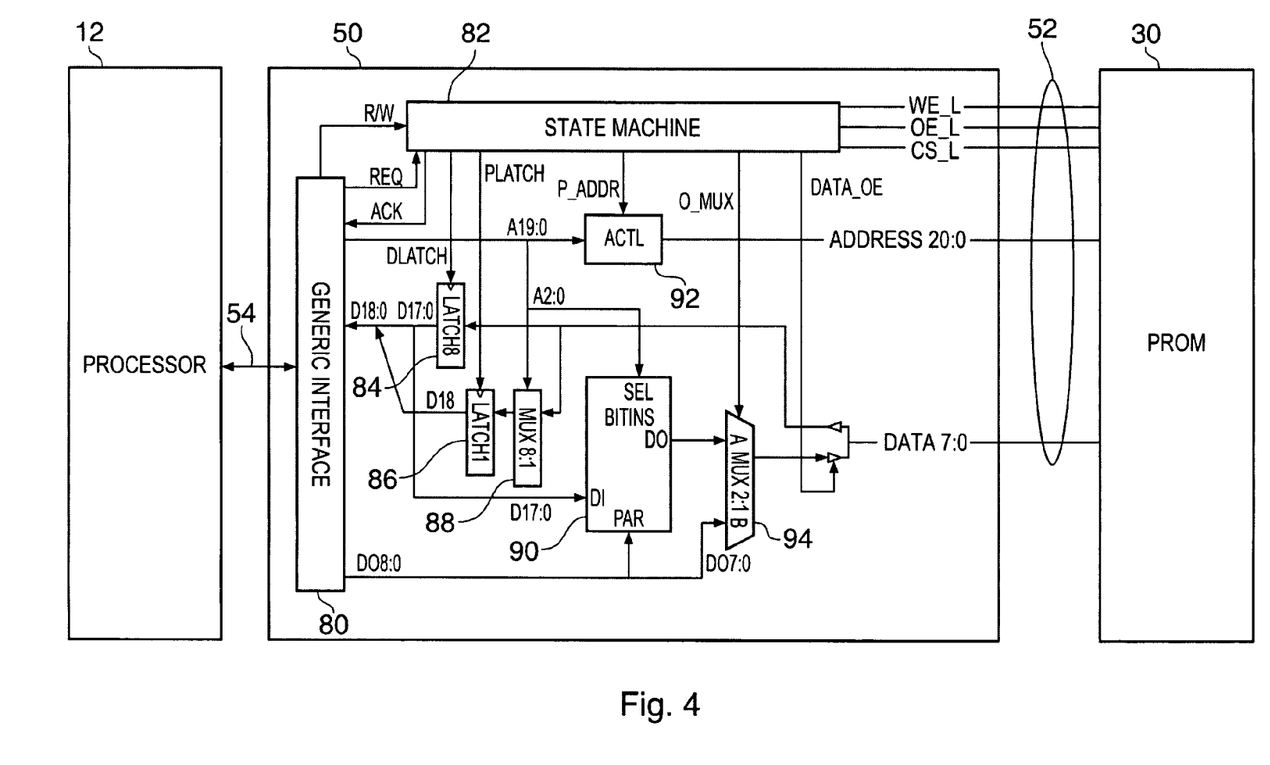
FIG. 4 illustrates elements of a logic unit of the computer system of FIG. 3 in more detail.

FIG. 4 illustrates the logic unit 50 in more detail.

In the example of a logic unit 50 shown in FIG. 4, a generic interface connects to the bus 54. A state machine 82 controls the operation of the logic unit.

In response to external signals from an external entity requesting data (in the present instance the processor 12), the generic interface 80 presents a 20 bit address on address lines A19:0 and asserts R/W to the state machine 82 and then asserts REQ to the state machine 82. The generic interface then waits for an ACK signal to be asserted on the ACK line.

If performing a read cycle (R/W=1), when ACK is asserted the generic interface latches 9 bits of data on DATA[8:0] (i.e. 8 bits including parity), and then negates REQ. The generic interface 80 then passes the data to the external entity that requested the data.

If performing a write cycle (R/W=0), when ACK is asserted the generic interface 80 acknowledges the cycle to the external entity.

The generic interface will not issue another REQ until ACK is negated by the state machine 82.

In a first example, a 2 MB PROM storing 1 MB of data is been pre-programmed with a data and parity region and is connected to the ADDRESS, DATA, OE_L and CS_L ports.

In this example, the State Machine has the behavior set out in Table 1 below.

The LATCH8 and LATCH1 blocks are transparent latches that hold the data on their data inputs when their control input is asserted.

TABLE 1

| STATE0: | NEGATE ACK | |
| --- | --- | --- |
| | NEGATE OE_L, CS_L, WE_L | |
| | NEGATE PLATCH, DLATCH, P_ADDR, O_MUX, DATA_OE | |
| | IF !(REQ) | -> STATE0 |
| | ELSE | -> STATE1 |
| STATE1: | ASSERT OE_L, CS_L | |
| | | -> STATE2 /*Read byte from PROM*/ |
| STATE2: | | |
| | | -> STATE3 /*Wait for data from PROM*/ |
| STATE3: | | |
| | | -> STATE4 /*Wait for data from PROM*/ |
| STATE4: | ASSERT DLATCH | |
| | | -> STATE5 /*Capture data byte*/ |
| STATE5: | ASSERT P_ADDR | |
| | | -> STATE6 /*Read parity from PROM*/ |
| STATE6: | | |
| | | -> STATE7 /*Wait for data from PROM*/ |
| STATE7: | | |
| | | -> STATE8 /*Wait for data from PROM*/ |
| STATE8: | ASSERT P_LATCH, ACK | |
| | | -> STATE9 /*Capture parity bit*/ |
| STATE9: | | |
| | IF (REQ) | -> STATE9 /*Wait for REQ negated*/ |
| | ELSE | -> STATE0 /*Go to IDLE state*/ |

In another example, a 2 MB static random access memory (SRAM) storing 1 MB of data is connected to the ADDRESS, DATA, WE_L, OE_L and CS_L ports. In this example, the state machine 82 has the behavior set out in Table 2 below.

In Table 1, [X:X-Y] specifies a bit field starting at bit X and extending through X-1, X-2 etc to X-Y and ":" is a concatenation operator e.g. 0:0 represents a two bit vector, both bits of which are constant zero.

TABLE 2

```
STATE0:   NEGATE ACK
          NEGATE OE_L, CS_L, WE_L
          NEGATE PLATCH, DLATCH, P_ADDR, O_MUX, DATA_OE
          IF !(REQ)              -> STATE0
          ELSE IF (R/W) -> STATE 1  /*Read cycle*/
          ELSE                   -> STATE10 /*Write cycle*/
STATE1: ASSERT OE_L, CS_L
                                 -> STATE2 /*Read byte from SRAM*/
STATE2:
                                 -> STATE3 /*Wait for data from SRAM*/
STATE3:
                                 -> STATE4 /*Wait for data from SRAM*/
STATE4:   ASSERT DLATCH
                                 -> STATE5 /*Capture data byte*/
STATE5:   ASSERT P_ADDR
                                 -> STATE6 /*Read parity from SRAM*/
STATE6:
                                 -> STATE7 /*Wait for data from SRAM*/
STATE7:
                                 -> STATE8 /*Wait for data from SRAM*/
STATE8:   ASSERT P_LATCH, ACK
                                 -> STATE9 /*Capture parity bit*/
STATE9:
          IF (REQ)               -> STATE9 /*Wait for REQ negated*/
          ELSE -> STATE0 /*Go to IDLE state*/
STATE10:  ASSERT OE_L, CS_L, P_ADDR
                                 -> STATE11 /*Read parity from SRAM*/
STATE11:
                                 -> STATE12 /*Wait for data from SRAM*/
STATE12:
                                 -> STATE13 /*Wait for data from SRAM*/
STATE13:  ASSERT DLATCH
                                 -> STATE14 /*Capture data byte*/
STATE14:  NEGATE OE_L
                                 -> STATE15 /*Turn off data from SRAM*/
STATE15:  ASSERT DATA_OE
                                 -> STATE16 /*Write parity to SRAM*/ STATE16:
          ASSERT WE_L
                                 -> STATE17 /*Strobe parity into SRAM*/
STATE17:  NEGATE WE_L
                                 -> STATE18 /*Complete write*/
STATE18:  ASSERT O_MUX NEGATE P_ADDR
                                 -> STATE19 /*Write data to SRAM*/
STATE19:  ASSERT WE_L
                                 -> STATE20 /*Stobe data into SRAM*/
STATE20:  NEGATE WE_L
                                 -> STATE21 /*Complete write*/
STATE21:  ASSERT ACK
                                 -> STATE9
```

First and second latches, LATCH8 84 and LATCH1 86, are transparent latches that hold the data on their data inputs when their control input is asserted. The latches 84 and 86 provide for latching of bits DI7:0 and DI8, respectively, where DI8 represents the parity bit.

The ACTL Block 92 receives address bits A19:0 and selectively receives a P_ADDR signal from the state machine 82. The ACTL block 92 provides the logical function identified in Table 3 below.

TABLE 3

```
IF !(P_ADDR)
    ADDRESS[20..0] = 0 : A[19..0]
ELSE
    ADDRESS[20..0] = 1 : 0 : 0 : 0 : A[19..3]
```

The multiplexer block MUX8:1 88 provides the logical function set out in Table 4 to select which input to connect to the latch 86 dependent upon the address input thereto.

TABLE 4

```
IF (ADDR == 0)
    OUTPUT = INPUT[0]
IF (ADDR = 1)
    OUTPUT = INPUT[1]
IF (ADDR = 2)
    OUTPUT = INPUT[2]
IF (ADDR = 3)
    OUTPUT = INPUT[3]
IF (ADDR = 4)
    OUTPUT = INPUT[4]
IF (ADDR = 5)
    OUTPUT = INPUT[5]
IF (ADDR = 6)
```

TABLE 4-continued

```
        OUTPUT = INPUT[6]
IF (ADDR = 7)
        OUTPUT = INPUT[7]
```

The multiplexer block MUX2:1 94 selects either a first input (DO from the BITINS block 90) or a second input (DO7:0 from the generic interface 80) to be passed to its output based on a signal O_MUX from the state machine 82. The multiplexer block 94 provides the function set out in Table 5 below.

TABLE 5

```
IF (O_MUX == 0)
        DATA[7..0] = A[7..0]
ELSE
        DATA[7..0] = B[7..0]
```

The BITINS block 90 receives address bits A2:0 at a SEL input and is operable to replace the bit addressed by the SEL input with the PAR bit. The PAR bit is the bit received at the PAR input from a DO8 bit from the generic interface 80. The BITINS block provides the function set out in Table 6.

TABLE 6

```
IF (SEL == 0)
        DO[7..0] = DI[7..1] : PAR
IF (SEL == 1)
        DO[7..0] = DI[7..2] : PAR : DI[0]
IF (SEL == 2)
        DO[7..0] = DI[7..3] : PAR : DI[1..0]
IF (SEL == 3)
        DO[7..0] = DI[7..4] : PAR : DI[2..0]
IF (SEL == 4)
        DO[7..0] = DI[7..5] : PAR : DI[3..0]
        IF (SEL == 5) DO[7..0] = DI[7..6] : PAR : DI[4..0]
IF (SEL == 6)
        DO[7..0] = DI[7] : PAR : DI[5..0]
IF (SEL == 7)
        DO[7..0] = PAR : DI[6..0]
```

The logic unit 50 is this able to provide mapping of first information between a first region of memory and a system interface and to map the protection information between a second region of memory and the system interface.

In examples of the invention the logic unit can be operable to check protection information of write data received via the system interface. Where protection information is also provided for addresses as well as data, the logic unit can also be configured to check the protection information of addresses received via the system interface. The processing unit 12 can be programmed to check the protection information of read data received via the system interface.

As indicated above, the system interface can be PCI connection. Alternatively the system interface could be some other interface providing protection information, for example a serial connection comprising a free running clock and a data in and data out connection. As discussed above, the data passing via the memory interface can be without protection, apart from the protection afforded by the spatially distributed protection information.

In other words, in order to provide protection for first information, protection information, for example parity information, for the first information can be spatially distributed with respect to the first information in memory. A logic unit can map the first information and the spatially distributed information corresponding thereto from the memory onto a connection operating under a protocol supporting the protection information.

Although the embodiments above have been described in considerable detail, numerous variations and modifications will become apparent to those skilled in the art once the above disclosure is fully appreciated. It is intended that the following claims be interpreted to embrace all such variations and modifications.

For example, the service controller functionality could additionally be implemented in the logic unit. Also, the logic unit functionality could be implemented by programming a programmable unit using program code. Accordingly, a computer program product for implementing the invention can be in the form of a computer program, which could for example, be carried by a carrier medium. The carrier medium could be a storage medium, such as a solid state, magnetic, optical, magneto-optical or other storage medium. The carrier medium could be a transmission medium such as broadcast, telephonic, computer network, wired, wireless, electrical, electromagnetic, optical or indeed any other transmission medium.

Also, although in the example of spatially distribution of the first and protection information, each of first and second regions is shown in different contiguous areas of memory, in another example, the first and second regions could be interleaved. For example, the regions could be arranged with 8 bytes of first information (i.e. in part of a first region and then one byte of 8 bits of parity information, each bit corresponding to a respect one of the eight bytes of first information (i.e. in part of a second region). This pattern could then be repeated throughout the memory with parts of the first region alternating with parts of the second region (i.e. 8 bytes of first information and one byte of parity information followed by eight bytes of first information followed by one byte of parity information and so on. Of course it will be appreciated that other configurations of first and second regions can be envisaged.

Also, although in the above examples a PROM (e.g., a flash PROM) or SRAM is used, the invention is equally applicable to other types of read-only and read/writeable memory, whether non-volatile or volatile memory.

What is claimed is:

1. A computer subsystem comprising a logic unit connectable to a system unit via a system interface and to a memory via a memory interface, wherein first information transmitted via the system interface is protected by protection information, and wherein the logic unit is operable to map the first information between a first region of the memory and the system interface and to map the protection information between a second region of the memory and the system interface.

2. The computer subsystem of claim 1, wherein the logic unit is operable to check the protection information of write data received via the system interface.

3. The computer subsystem of claim 1, wherein the logic unit is operable to check the protection information of addresses received via the system interface.

4. The computer subsystem of claim 1, comprising a system unit operable to check the protection information of read data received via the system interface.

5. The computer subsystem of claim 1, wherein the system interface comprises a serial connection.

6. The computer subsystem of claim 5, wherein the serial connection comprises a free running clock, data in and data out connection.

7. The computer subsystem of claim 1, wherein information is transmitted via the memory interface unprotected.

8. The computer subsystem of claim 1, wherein the first region of the memory comprises a first plurality of contiguous address locations and second region of the memory comprises a second plurality of contiguous address locations.

9. The computer subsystem of claim 8, wherein the mapping of the protection information to the second region of memory is dependent on the mapping of the first information to the first region of memory.

10. The computer subsystem of claim 9, wherein an item of protection information is associated with a block of first information, and wherein the ordering of the protection information in the second region of memory corresponds to the ordering of the corresponding blocks of first information in the first region of memory.

11. The computer subsystem of claim 1, wherein the protection information comprises parity information.

12. The computer subsystem of claim 1, wherein the protection information comprises error correction information.

13. The computer subsystem of claim 1, wherein the first information comprises system boot information.

14. The computer subsystem of claim 1, further comprising non-volatile memory as said memory.

15. The computer subsystem of claim 14, wherein the memory comprises flash programmable read-only memory unit.

16. The computer subsystem of claim 1, wherein the memory comprises SRAM.

17. The computer subsystem of claim 1, wherein the logic unit comprises a field programmable logic unit.

18. The computer subsystem of claim 1, comprising a first integrated circuit forming said logic unit and a second integrated circuit forming said system unit.

19. The computer subsystem of claim 18, comprising a further integrated circuit forming said memory.

20. A computer system comprising a system unit, a logic unit connected to the system unit via a system interface and a memory connected to the logic unit via a memory interface, wherein first information transmitted via the system interface is protected by protection information, and wherein the logic unit is operable to map the first information between a first region of the memory and the system interface and to map the protection information a second region of the memory and the system interface.

21. The computer system of claim 20, wherein the logic circuit is operable to check the protection information of write data received via the system interface.

22. The computer system of claim 20, wherein the logic circuit unit is operable to check the protection information of addresses received via the system interface.

23. The computer system of claim 20, wherein the system unit is operable to check the protection information of read data received via the system interface.

24. The computer system of claim 20, wherein the system interface comprises a serial connection.

25. The computer system of claim 20, wherein the serial connection comprises a free running clock, data in and data out connection.

26. The computer system of claim 20, wherein information is transmitted via the memory interface unprotected.

27. The computer system of claim 20, wherein the memory comprises a non-volatile memory.

28. The computer system of claim 20, wherein the memory comprises flash programmable read-only memory unit.

29. The computer system of claim 20, wherein the memory comprises SRAM.

30. The computer system of claim 20, wherein the first region of the memory comprises a first plurality of contiguous address locations and second region of the memory comprises a second plurality of contiguous address locations.

31. The computer system of claim 30, wherein the mapping of the protection information to the second region of memory is dependent on the mapping of the first information to the first region of memory.

32. The computer system of claim 31, wherein an item of protection information is associated with a block of first information, and wherein the ordering of the protection information in the second region of memory corresponds to the ordering of the corresponding blocks of first information in the first region of memory.

33. The computer subsystem of claim 20, wherein the protection information comprises parity information.

34. The computer system of claim 20, wherein the protection information comprises error correction information.

35. The computer system of claim 20, wherein the first information comprises system boot information.

36. The computer system of claim 20, wherein the logic unit comprises a field programmable logic unit.

37. The computer system of claim 20, wherein the system unit comprises a first integrated circuit and the logic unit comprises a second integrated circuit.

38. The computer system of claim 20, wherein the memory comprises a further integrated circuit.

39. A computer subsystem comprising logic means connectable to a system unit via system interface means and to a memory via memory interface means, wherein first information transmitted via the system interface means is protected by protection information, and wherein the logic means is operable to map the first information between the system interface means and a first region of the memory and to map the protection information between the system interface and a second region of the memory.

40. A method of providing protection for first information, the method comprising a logic unit connected to a system unit via a system interface, wherein the first information is transmitted via the system interface protected by protection information, and connected to a memory via a memory interface, the logic unit mapping the first information between a first region of the memory and the system interface and mapping the protection information between a second region of the memory and the system interface.

41. A computer readable medium storing a program code, wherein the program code comprises code for controlling a logic unit connected to a system unit via a system interface, wherein the first information is transmitted via the system interface protected by protection information, and connected to a memory via a memory interface, the program code being operable to control the logic unit to map the first information between a first region of the memory and the system interface and to map the protection information between a second region of the memory and the system interface.

* * * * *